Figure 1:
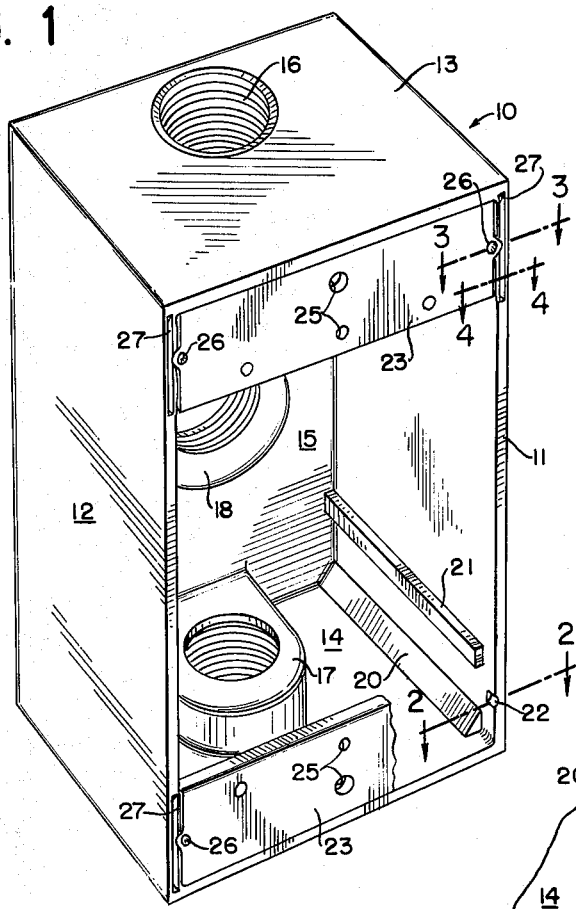

INVENTOR
SAUL I. SLATER
BY Darby & Darby
ATTORNEYS

3,215,769
CAST WEATHERPROOF ELECTRICAL OUTLET BOX WITH STAKED END PLATES FOR MOUNTING ELECTRICAL WIRING DEVICES

Saul I. Slater, Glen Cove, N.Y., assignor to Slater Electric Inc., Glen Cove, N.Y., a corporation of New York
Filed Mar. 19, 1962, Ser. No. 180,618
4 Claims. (Cl. 174—53)

The present invention relates to electrical outlet boxes and particularly to such outlet boxes for service out of doors or in any location subject to dampness.

In the past weatherproof electrical outlet boxes of the type here disclosed have been made in a number of ways, but all of these methods have resulted in boxes which were either extremely expensive or difficult to use or both.

Outlet boxes of the type described are generally rectangular parallelepipeds having an open side and are intended to have a mounting strap extending across the generally open side carrying the particular electrical wiring device desired such, for example, as a plug receptacle, switch, etc. These boxes are provided with various openings as will appear hereinafter, these openings providing access for permanent circuit connections.

The mounting of wiring devices in such boxes, requires that threaded apertures be provided in mating relation with the apertures on a standard wiring device mounting strap. In one type of device currently on the market, end plates are provided which extend across the open side adjacent the ends thereof and which are cast integrally with the remainder of the box. Such casting requires a collapsible mold and thus renders the box difficult to manufacture and correspondingly expensive.

Another form of weatherproof box comprises a casting without any end plates which casting has posts extending upwardly from the base on which mounting straps and coverplates may be fastened. Since the outlet box is in the neighborhood of two inches in depth and the posts must extend for substantially this entire depth, this makes for difficult casting and in many instances the posts do not fill out properly resulting in a large number of rejects which again increases the cost of producing the box. Moreover these posts must be hollow and threaded for a major portion of their height in order to accommodate the wiring device mounting screws and this again is difficult and results in rejects.

This latter form of box is sometimes modified by fixing end plates to the upstanding posts and swaging the posts over to fix the end plates in position. This arrangement is preferable in that it provides some latitude in the location of the posts since the end plates may then be provided with threaded openings for the mounting of the wiring device supporting strap. The difficulties of providing such upstanding posts is, however, not overcome and these boxes are also costly, particularly in view of the large number of rejects.

My invention contemplates a weatherproof outlet box for electrical wiring devices of generally the same character as those mentioned hereinabove, but having end plates which are readily permanently fixed to a casting without necessitating the use of deep drawn upstanding posts or the casting of the plates integrally with the main body of the box.

It is an object of the invention to provide a weatherproof outlet box for electric wiring devices comprising a generally rectangular parallelepiped casting having one open side and having plates which are flush with the open side at the opposite ends thereof, the plates being separately manufactured as by stamping.

It is a further object of the invention to provide such an outlet box in which the end plates are readily installed and are permanently held in position by means of a simple, inexpensive swaging or staking operation.

Figure 3:
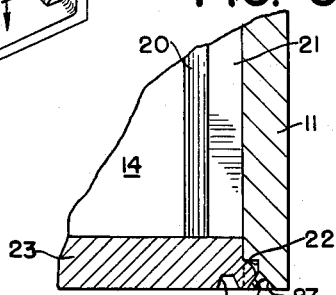
Figure 4:
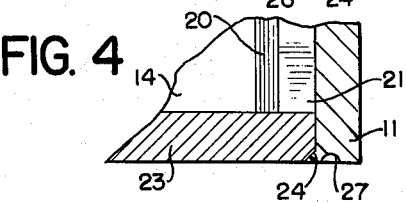
Figure 2:
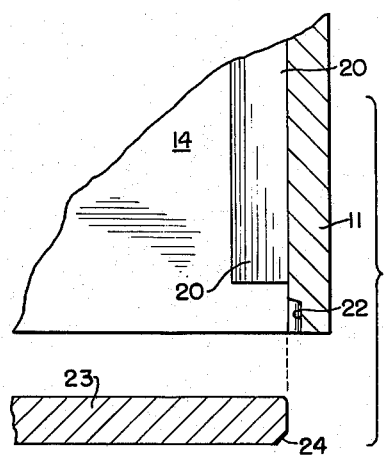

Other objects and features of the invention will be apparent when the following description is considered in connection with the annexed drawings, in which, FIGURE 1 is a perspective view of an outlet box in accordance with my invention with one of the end plates broken away to show the mode of mounting;

FIGURE 2 is a fragmentary cross-sectional view taken on the plane of the line 2—2 of FIGURE 1 showing particularly the formation of a small recess in the box wall;

FIGURE 3 is a similar fragmentary view taken on the plane of the line 3—3 of FIGURE 1 showing how the material of the mounting plate is expanded by a punching or staking operation into the small recess of FIGURE 2; and FIGURE 4 is a cross-sectional view taken on the plane of the line 4—4 of FIGURE 1 illustrating particularly the bevel of the edge of the mounting plate and the cooperation of this bevelled edge with material displaced from the side wall by a staking operation to thereby hold the plate in position.

Referring now to the drawings and particularly to FIGURES 1 and 2, the outlet box of my invention comprises a casting 10 having the two side walls 11 and 12, end walls 13 and 14 and base 15.

This casting also includes the inwardly extending bosses 16 and 17 which are threaded in the usual manner to receive a matingly threaded conduit. In addition, a shallow boss 18 is cast integrally with the base, this boss likewise extending inwardly and being threaded to receive the conduit. It will be understood that the number and arrangements of the conduits varies and that the foregoing is merely exemplary. Also cast integrally with the base are eight ribs, four at either end.

Four ribs 20 are provided, these ribs extending diagonally across the corners formed by the end and side walls of the box and extending upwardly from the base to within a short distance of the upper edges of the end and side walls. As will appear later, the mounting plates are of such thickness that when they rest on the top of the ribs 20 the upper surface thereof is flush with the edges of the end and side walls.

In a similar manner four ribs 21 are provided, these ribs being located on the side walls and spaced from the end walls a distance substantially equal to the width of the mounting plates. The ribs 21 likewise extend upwardly from the base and terminate beneath the edges of the corresponding side walls so that these ribs also support the mounting plates with their upper edges flush with the edges of the end and side walls.

The ribs mentioned are formed during the casting of the box as are small recesses 22, one of which is provided in each side wall spaced from the corresponding end wall approximately half of the width of the mounting plate, these recesses 22 providing a means to prevent lateral movement of the mounting plates as will shortly be described.

A mounting plate 23 is positioned at each end of the box 10, these mounting plates being rectangular and having the upper side edges bevelled or chamfered as indicated at 24 in FIGURES 2 through 4. The rectangular plates 23 are formed by stamping and are provided with threaded holes 25 properly positioned so that electrical wiring devices, such as switches, outlets and the like, may readily be mounted on the plates and secured in position by screws threaded into the holes 25.

The mounting plates are placed in the box resting on the ribs 20 and 21 as shown in the drawings and after they are so positioned the area of the box side walls 11 and 12 adjacent the chamfered portions of the mounting plates 23 are staked causing the metal to be displaced inwardly as shown particularly in FIGURES 3 and 4 to thus hold the mounting plates downwardly and in contact with the ribs 20 and 21. The plates are also punched or staked at the points 26 thereby causing metal to be displaced into the small recesses 22 as shown particularly in FIGURE 3. This staking or punching of the metal at 26 is preferably performed simultaneously with the side wall staking indicated at 27 although obviously it can be performed separately if desired. The displacing of the material from the mounting plates 23 into the recesses 22 prevents any slipping of the plate laterally and assures that it is permanently held in position at the end of the box wall, as indicated, the staking along the line 27 assures that the plate will be held with its under surface against the upper edges of the ribs 20 and 21.

Due to the fact that the rectangular mounting plates 23 are entirely flat and flush with the box edges, wiring devices may be mounted thereon with ease utilizing the usual mounting strap of the wiring device.

It will be observed that the construction described provides a very rugged mounting for the mounting plates 23 while at the same time utilizing a box which is readily cast and requires no expensive collapsible mold or the like.

It will of course be understood that the box of this invention is intended to be utilized with a coverplate which seals the box against the entrance of moisture, although such coverplate is not essential and there are instances in which a box of this type is utilized with the ordinary switch plate or receptacle plate rather than with a weatherproof cover.

While I have described a preferred embodiment of my invention, it will be understood that I wish to be limited not by the foregoing description, but solely by the claims granted to me.

What is claimed is:

1. A weatherproof electrical outlet box comprising, in combination, a cast metallic box including base, side and end walls defining a cavity for receipt of an electrical wiring device, a plurality of integral ribs extending upwardly from the base along the side walls adjacent the ends of the box, said ribs terminating at points spaced from the upper edges of the side walls, a pair of wiring device mounting plates, one extending across each end of the box, each said mounting plate resting upon corresponding ribs, said mounting plates being held in place against said ribs by material displaced inwardly from the upper edge portions of the side walls and overlying the edges of said mounting plates, and means for holding said mounting plates against the box end walls, said holding means including small recesses in said box side walls adjacent the sides of said mounting plates and material displaced from said mounting plate sides into said small recesses.

2. A weatherproof electrical outlet box in accordance with claim 1 wherein said box is in the form of a rectangular parallelepiped, said mounting plates are rectangular and said material displaced from said side walls overlies the entire shorter edges of said rectangular mounting plates.

3. A weatherproof electrical outlet box comprising, in combination, a cast metallic box including base, side and end walls defining a cavity for receipt of an electrical wiring device, a plurality of integral ribs extending upwardly from the base along the side walls adjacent the ends of the box, said ribs terminating at points spaced from the upper edges of the side walls, a pair of wiring device mounting plates, one extending across each end of the box, each said mounting plate resting upon corresponding ribs, said mounting plates being held in place against said ribs by material displaced inwardly from the upper edge portions of the side walls and overlying the edges of said mounting plates, said mounting plates having bevelled upper side edges with said material displaced inwardly from the upper edge portions of said side walls overlying said bevelled edges and means for holding said mounting plates against the box end walls.

4. A weatherproof electrical outlet box comprising, in combination, a cast metallic box including base, side and end walls defining a cavity for receipt of an electrical wiring device, a plurality of integral ribs extending upwardly from the base along the side walls adjacent the ends of the box, said ribs terminating at points spaced from the upper edges of the side walls, a pair of wiring device mounting plates, one extending across each end of the box, each said mounting plate resting upon corresponding ribs, said mounting plates having bevelled edges and being held in place against said ribs by material displaced inwardly from the upper edge portions of the side walls and overlying the bevelled edges of said mounting plates, and means for holding said mounting plates against the box end walls, said holding means including material of each of said mounting plates displaced into corresponding cavities in each of said side walls.

References Cited by the Examiner

UNITED STATES PATENTS

| 1,275,576 | 8/18 | Lockwood. | |
| 1,686,562 | 10/28 | Jackson. | |
| 1,979,804 | 11/34 | Lutz. | |
| 2,236,180 | 3/41 | Kost | 29—509 |
| 2,395,878 | 3/46 | Keene | 29—509 |
| 2,486,769 | 11/49 | Watson | 29—521 X |
| 2,991,327 | 7/61 | Bellek | 174—53 |
| 3,043,003 | 7/62 | Lever | 29—514 X |

FOREIGN PATENTS

| 106,601 | 2/39 | Australia. |
| 209,750 | 1/56 | Australia. |
| 886,934 | 7/49 | Germany. |
| 597,370 | 8/59 | Italy. |

JOHN F. BURNS, *Primary Examiner.*

JOHN P. WILDMAN, E. JAMES SAX, *Examiners.*